Figure 1:
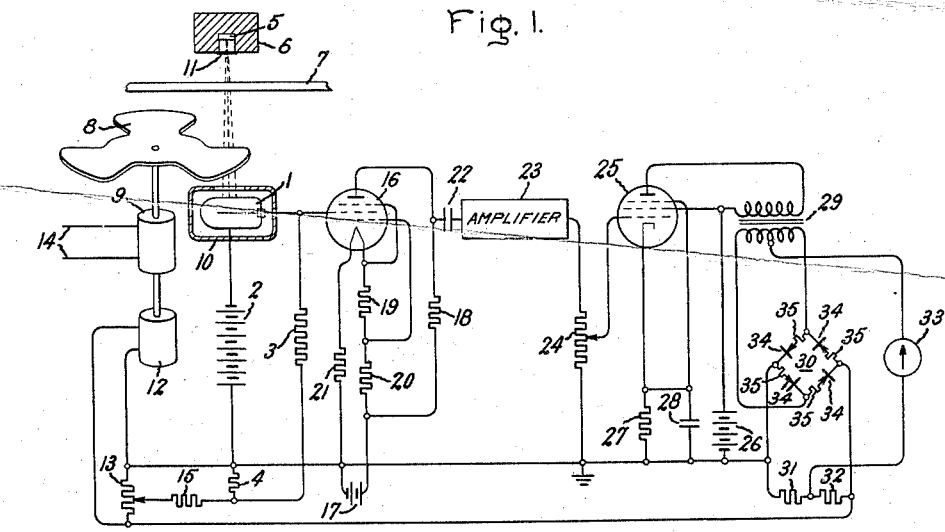

Nov. 15, 1949     C. W. CLAPP     2,488,269

NONCONTACTING THICKNESS GAUGE

Filed June 19, 1948

Inventor:
Charles W. Clapp,
by *Prowell S. Mack*
His Attorney.

Patented Nov. 15, 1949

2,488,269

UNITED STATES PATENT OFFICE 2,488,269

NONCONTACTING THICKNESS GAUGE

Charles W. Clapp, Schenectady, N. Y., assignor to General Electric Company, a corporation of New York Application June 19, 1948, Serial No. 33,945

19 Claims. (Cl. 250—83.6)

This invention relates to non-contacting thickness gauges, and in particular to an improved thickness gauge employing subatomic particles, such as beta rays, as a measuring agent.

An object of the invention is to provide an improved non-contacting thickness gauge which is especially adapted to measure the thickness of paper, plastic, rubber, textile fabrics, and other light materials.

Another object of the invention is to provide such a gauge, accurate operation of which is substantially unaffected by the presence of background radiation due to cosmic rays, radioactivity of the material measured, or nearby radioactive substances.

Other objects and advantages of the invention will become apparent as the description proceeds.

Previous attempts have been made to measure the thickness of materials with non-contacting gauges using subatomic particles such as beta rays as a measuring agent. "Subatomic particles," as used herein, refers to those physical particles, not predominantly electromagnetic radiations, which are smaller than an atom. Thickness gauges of this type measure the thickness of a material by its ability to absorb energy from a beam of subatomic particles. Given a material of fixed composition interposed in the beam, the degree of such energy absorption by the material is a function of its thickness.

The basic elements of such a thickness gauge are a constant source of subatomic particles, spaced a fixed distance from a suitable detector, and means to indicate the total number or energy of particles reaching the detector. When the material, the thickness of which is to be measured, is interposed between the source and the detector, a reduction in the number or energy of particles reaching the detector is noted; and this reduction is used to measure the thickness of the material by reference to a suitable calibration curve.

The particles used may be alpha particles, beta particles, positrons, neutrons, protons, deuterons, or mesons: the choice depends upon the thickness and composition of the material to be gauged and the source available. Alpha particles obtained from a radioactive source have a comparatively short range, up to two inches in air or approximately .003 inch of paper, and consequently can be used to measure the thickness of only the thinnest foils. Beta particles and positrons from a radioactive source have a range of the order of 40 inches of air or .05 inch of paper. The exact ranges vary with the energy of the particles, which depends upon the source from which the particles are obtained. These particles are thus very useful in measuring the thickness of light materials such as paper, plastics, textiles, and thin sheets of metal. Neutrons, being uncharged, have a much longer range than any of the above. Protons and deuterons have a range intermediate between alpha and beta particles. Since beta particles are relatively easy to obtain and have a range useful in many industrial applications, the invention will be described in terms of their use. It will be understood, however, that for other applications other types of subatomic particles may be used without departing from the principles of the invention.

There are several obstacles to the successful use of subatomic particles as a measuring agent to provide an accurate, commercially acceptable thickness gauge. One obstacle is the presence of background radiation which tends to cause spurious responses in the detector. This background radiation includes cosmic rays, radioactive emanations from the material tested, and radiation from nearby radioactive materials. Normal background radiation encountered in an industrial plant is frequently of sufficient magnitude to be troublesome. Another obstacle inheres in the fact that the detectors of subatomic particles most suitable for use in thickness gauges also respond to electromagnetic radiations such as X-rays and gamma rays. These electromagnetic radiations are, in general, much more penetrating than beta rays, and hence are absorbed only in small degree by light materials to be measured by a beta ray thickness gauge. Thus they do not aid, but serve only to hinder thickness measurements of light materials. In general, many suitable radioactive sources of subatomic particles also emit gamma rays, and these electromagnetic radiations produce spurious responses in the detector which tend to mask or obscure the measurement indications.

A manner in which these obstacles may be overcome is pointed out in the following description of apparatus embodying principles of the present invention.

Figure 2:
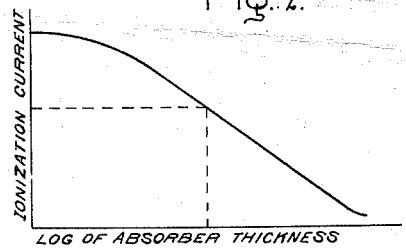
Figure 3:
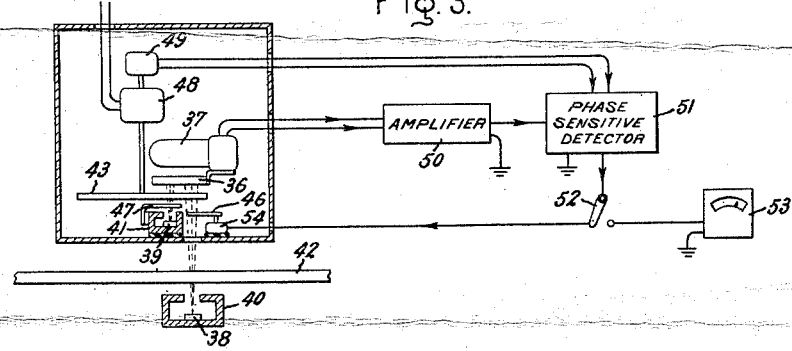
Figure 4:
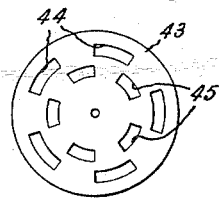

The features of the invention which are believed to be novel and patentable are pointed out in the claims forming a part of this specification. For a better understanding of the invention reference is made in the following description to the accompanying drawing in which Fig. 1 is a schematic diagram of one form of the invention; Fig. 2 is a graph of ionization current, for example in the ionization chamber shown in Fig. 1 due to beta rays from a radium source, plotted against the logarithm of thickness of the material measured, and will be used in explaining one aspect of the operation of this invention; Fig. 3 is a schematic diagram of a comparator form of the invention; and Fig. 4 is a plan view of a rotary shutter used in the apparatus of Fig. 3.

Referring now to Fig. 1, ionization chamber 1 is a detector responsive to subatomic particles, such as beta rays. A battery 2, or other suitable voltage source, provides a high potential, 600 volts for example, between the ionization chamber electrodes through a circuit including resistors 3 and 4. Each particle arriving at the detector produces ionization within chamber 1, which permits a pulse of current to flow through the circuit. The average current flowing is thus proportional to the rate of arrival of such particles at the detector. This current flowing through resistors 3 and 4 causes a voltage across these resistors which is likewise proportional to the rate of arrival of such particles. Preferably resistor 3 is much larger than resistor 4, so that the major part of this voltage is across resistor 3. Typical values are: resistor 3, 500 megohms resistor 4, 100 ohms. The voltage across resistor 4 is otherwise controlled, as hereinafter explained.

Other detectors responsive to subatomic particles, such as a phototube with fluorescent screen, may be used in place of the ionization chamber. In each case a voltage is provided which is proportional to the rate of arrival of such particles at the detector. Which detector is best suited for a particular application largely depends upon the type of particles to be detected, and the respective characteristics of the various detectors, as is known in the art.

A source of beta rays, such as radioactive material 5, is preferably enclosed within a shield which may be a lead box 6 having a small window in one of its sides. This source is constructed and positioned to direct a beam of beta rays through the material 7 to be measured and toward detector 1. The beta rays are absorbed to a degree depending upon the thickness of material 7; and the unabsorbed particles reaching detector 1 cause a voltage across resistor 3. The magnitude of this voltage is a measure of thickness of the material.

Examples of radioactive materials which may be used as a source of beta rays are radium, strontium 80, carbon 14, and caesium 134. Strontium 90 and carbon 14 are especially desirable since they have relatively long half lives and do not emit any substantial amount of gamma rays, which are undesirable because they increase the background radiation. Carbon 14 emits low energy beta rays, suitable for measuring very thin metal foil or paper having a thickness in the order of one to seventy-five mils. Strontium 80 provides beta rays of higher energy, suitable for measuring paper having a thickness in the order of six mils to several hundred mils. The beta rays from caesium 134 are intermediate in energy between those from carbon 14 and those from strontium 90.

As explained, background radiations also produce voltages across resistor 3. To prevent these spurious voltages from masking the measurement voltage, a rotary shutter 8, driven by electric motor 9, is provided to modulate periodically the particle density of the beam of beta rays. This shutter may be made of light material, such as aluminum, which has a thickness just sufficient to absorb substantially all of the beta rays when the shutter is in its position of maximum attenuation. The shutter, as it rotates, periodically interrupts the beta ray beam, so that the measurement voltage across resistor 3 has a modulation-frequency alternating component. Gamma rays, having greater penetrating power, undergo relatively little attenuation by the shutter; and therefore, their influence on this alternating component of voltage is negligible. The effects of background radiation of less penetrating types are reduced to negligible proportions by a shield 10 which surrounds and encloses the detector except at the point of arrival of the beta ray beam. If the material measured is appreciably radioactive, shutter 8 should be positioned between the beta ray source and the measured material, so that emanations from the material are not modulated. But if the material measured is free of radioactivity, it is usually more convenient to place the shutter between the material and the detector as illustrated in the drawing.

If desired, alpha particles can be eliminated from the beam by placing a thin metal foil 11 over the window in shield 6. Such a foil absorbs the alpha particles without substantially reducing the number of beta ray particles in the beam.

It is evident that the alternating component of voltage across resistor 3 is an accurate indicator of the thickness of material 7; and that the principal problem now remaining is to measure this alternating component of voltage. This can best be done by a null-balance system, as will now be described.

An alternator 12 which is driven in synchronism with shutter 8 by motor 9 produces across resistor 13 an alternating voltage 180° out-of-phase with the fundamental alternating component of voltage across resistor 3. If, for example, motor 9 is a four-pole synchronous motor operated through connections 14 from a 60-cycle alternating current source, alternator 12 can be a six-pole machine to provide a constant amplitude, 90 cycle per second alternating voltage across resistor 13. A typical value of this voltage is about 15 volts R. M. S. Both machines, being connected to the same shaft, will run at 1800 R. P. M. Since shutter 8 has three vanes, the fundamental alternating component of voltage across resistor 3 will also have a frequency of 90 cycles per second. It is desirable that the frequency of these voltages be different from the power line frequency of 60 cycles or any of its harmonics. This minimizes chances of error due to line-frequency noise voltages in the amplifier. The phase of the voltage across resistor 13 can be adjusted to exactly 180° out-of-phase with the voltage across resistor 3 by adjusting the stator position of alternator 12, or by any other convenient phase-shifting means.

Resistor 13 is provided with an adjustable tap by means of which a part of the 180° out-of-phase voltage is applied through resistor 15 across resistor 4. This adjustable tap is calibrated so that resistors 13, 15, and 4 form a calibrated voltage attenuator by means of which an adjustable fraction of the 180° out-of-phase voltage can be applied across resistor 4. Since resistor 4 is connected in series with resistor 3, the instantaneous values of this attenuated, 180° out-of-phase voltage are added to the alternating component of voltage across resistor 3 produced by the detector; and the sum of these two voltages, which, it will be seen, is an error voltage indicating unbalance of the measuring circuit, is applied to a control electrode of vacuum tube 16.

Tube 16 amplifies the error voltage. To reduce tube noise and grid current, it is desirable that tube 16 operate with a low plate voltage; for example, about 15 volts, which may be supplied by battery 17 or other convenient D.-C. source. Resistor 18 is the plate load resistor for this tube; while resistors 19, 20 and 21 provide the necessary voltage drop to operate the tube filament from battery 17 and also provide proper bias voltages for the various electrodes of the tube.

The error voltage is next applied through capacitor 22 to a voltage amplifier 23. This voltage amplifier can be a conventional vacuum-tube amplifier. An amplifier error voltage thus appears across resistor 24 and is applied to the control grid of vacuum tube 25. This vacuum tube, voltage source 26, cathode resistor 27, and by-pass capacitor 28 constitute a power amplifier which provides an alternating-current signal in output transformer 29 responsive to the error voltage.

The secondary of transformer 29 is connected across diagonally opposite corners of a ring rectifier 30. Resistor 13 is connected across the other pair of diagonally opposite corners of rectifier 30. Equal resistors 31 and 32, connected as shown, act as a voltage divider in parallel with resistor 13. A zero-center D.-C. voltmeter 33, or other voltage responsive device, is connected between a center tap on the secondary of transformer 29 and the junction of resistors 31 and 32. As is well known, rectifier ring 30 connected in such a circuit acts as a phase-sensitive detector, so that the amount which the needle of meter 33 deflects indicates the magnitude of the error voltage, and the direction in which the needle deflects indicates its phase. Resistors 35, which may each have a value of about 400 ohms, are respectively connected in series with rectifier elements 34 to minimize unbalance effects due to slight differences in the impedance characteristics of the several rectifier elements. These resistors also reduce the input power required by the rectifier ring.

The phase-sensitive detector 30, or rectifier ring, responds principally to the fundamental component of the error signal, and to some extent to odd harmonics, and is substantially non-responsive to even harmonics. In any event, for every value of voltage across resistor 3, there is a corresponding value of voltage across resistor 4, in phase opposition to the fundamental component, which will produce a zero D.-C. output of the phase-sensitive detector so that a balance may always be obtained regardless of possible differences in wave form of the respective voltages across resistors 3 and 4. In other words, the practical effect of harmonics in the voltage across resistor 3, which are relatively small compared to the fundamental component, is merely a small change in value of the voltage across resistor 4 required for balance, which is taken care of in the calibration of the apparatus. Since the fundamental component is the most important, best efficiency is obtained by designing the constants of the circuit, including amplifier 23, to provide maximum response to the fundamental component and to transmit the harmonic components less efficiently. It is possible to design shutter 8 so that voltage across resistor 3 is substantially sinusoidal and thus eliminate the harmonics; but in practice this is not necessary.

To achieve greatest accuracy, the calibrated tap of resistor 13 is adjusted to give zero reading of meter 33. This indicates that the 180° out-of-phase voltage across resistor 4 is substantially equal in magnitude to the fundamental alternating component of voltage across resistor 3; and changes in amplifier gain cause no error in measurement. The tap position of resistor 13 can be calibrated to indicate the thickness of material 7.

Radioactive material 5 can be so chosen that the average ionization current in chamber 1 is linearly related to the logarithm of absorber thickness over a considerable range of thickness. The absorber, of course, is the material measured. Radium, for example, yields this characteristic over a substantial thickness range, as illustrated by Fig. 2. Strontium 90 is another material which produces such a characteristic. If this is done, voltmeter 33 can be calibrated to indicate percentage deviation from a standard thickness. Thus, if it is desired to control an industrial process to maintain the thickness of sheet 7 within a certain allowable percentage deviation from a standard thickness, the tap of resistor 13 can be positioned so that with a standard thickness of the material, voltmeter 33 will read zero. With the gauge so calibrated, voltmeter 33 will thereupon continuously indicate the percentage deviation from this standard. The calibration of voltmeter 33 can be corrected by adjusting the tap on resistor 24. It should be noted that this characteristic is obtained only by selecting a particular radioactive source for the purpose, such as radium or strontium 90. The usual relation applying to electromagnetic radiations, such as X-rays, is that the logarithm of ionization current is a linear function of absorber thickness, which is not a proper relation for percentage-deviation calibration as described.

A difficulty in the apparatus of Fig. 1 is that frequent recalibration may be necessary because of the gradual decrease in strength of radioactive material 5, unless radioactive material having a relatively long half-life is used. This difficulty is eliminated in the comparator arrangement schematically illustrated in Fig. 3, and background effects are still further reduced. Referring now to this figure, the detector illustrated comprises a fluorescent screen 36 and a phototube 37. The phototube, which responds to light emitted by the fluorescent screen when particles impinge thereon, provides an output voltage which is dependent upon the number of particles impinging upon screen 36. Two radioactive sources 38 and 39 are provided, and respectively enclosed in lead shields 40 and 41. Source 38 directs a beam of beta rays through the material 42 to be measured toward screen 36. Source 39 directs a beam of beta rays toward screen 36 which does not pass through the material measured. Preferably source 38 and source 39 are of the same radioactive material; but their strengths need not be equal, since the strength of each decays logarithmically and the ratio of the two will remain the same.

A rotary shutter 43, illustrated in plan view in Fig. 4, is positioned and adapted to modulate periodically the particle densities of both beta ray beams, in such a way that the modulation of one beam is 180° out-of-phase with the modulation of the other beam. This can be accomplished by providing two rows of openings in shutter 43. The outer row of openings 44 permits passage of one beam to screen 36, and the inner row of openings 45 permits passage of the other beam to screen 36. It is evident that the beam of beta rays passing through the material to be measured causes an alternating component in the output voltage of phototube 37; and that the other beam produces an alternating component of voltage 180° out-of-phase with the first. These two alternating components of voltage can be made equal, so that they will cancel each other, by adjusting the position of a calibrated attenuator 46 positioned in one of the beams. A fixed attenuator 47 can be placed in the other beam if necessary. Attenuator 46 can be calibrated in terms of thickness of a material measured, and will remain accurately calibrated until it becomes necessary to replace the radioactive materials 38 and 39.

Shutter 43 is driven by motor 48, which also drives an alternator 49 to provide a voltage 180° out-of-phase with one of the alternating components of voltage in the output of phototube 37.

The error signal representing a difference in magnitude of the two alternating components of voltage in the output of phototube 37 is amplified by amplifier 50 and detected by phase-sensitive detector 51, in a manner similar to the operation of apparatus described in connection with Fig. 1. If switch 52 is placed in its right-hand position, this detected error signal will cause an indication of meter 53. Attenuator 46 can then be adjusted manually to give a null or zero reading of meter 53.

Automatic adjustment of attenuator 46 can be effected by providing a motor 54 which will respond to the detected error signal when switch 52 is in its lefthand position. As this automatic adjusting apparatus involves nothing more than a simple control mechanism, details of which can be readily evolved by those skilled in the art, it will not be described in detail here.

Having described the principle of this invention and the best mode in which I have contemplated applying that principle, I wish it to be understood that the apparatus described is illustrative only, and that other means can be employed without departing from the true scope of the invention defined by the following claims.

What I claim as new and desire to secure by Letters Patent of the United States is:

1. A thickness gage comprising a detector of subatomic particles which provides a voltage dependent in magnitude on the rate of arrival of such particles at the detector, a source of subatomic particles positioned to direct a beam of such particles through the material measured toward said detector, means including a shutter positioned in the beam between said source and said detector to modulate periodically the particle density of such beam, so that the voltage provided by said detector has an alternating component, said shutter being proportioned to produce substantial variations in its attenuation of such beam of sub-atomic particles and to be substantially transparent to radiations of greater penetrating power, whereby high energy background radiations do not substantially influence such alternating component of voltage, and means to measure such alternating component of voltage.

2. A gage as in claim 1 in which the beam of subatomic particles used consists principally of beta rays.

3. A gage as in claim 1 in which the detector includes an ionization chamber.

4. A gage as in claim 1 in which the detector includes a fluorescent screen adapted to emit light responsive to the impinging of subatomic particles thereon, and a phototube responsive to such fluorescent light.

5. A gage as in claim 1 in which the source of subatomic particles includes a radioactive material which emits such particles.

6. A gage as in claim 5 in which the radioactive material is radium.

7. A gage as in claim 1 in which the shutter is a rotary shutter driven at a substantially constant speed of rotation.

8. A gage as in claim 1 in which the shutter is constructed of thin material relatively transparent to X-rays and gamma rays and proportioned so that the maximum attenuation provided by the shutter is just sufficient to eliminate from the beam substantially all subatomic particles of the type which it is desired to use in making the thickness measurement.

9. A thickness gage comprising a detector of subatomic particles of the type which provides a voltage proportional in magnitude to the rate of arrival of such particles at the detector, a source of subatomic particles and shielding means therefor positioned to direct a beam of such particles through the material measured toward said detector, a shutter and operating means therefor positioned in such beam between said source and said detector to modulate periodically the particle density of such beam, so that the voltage provided by said detector has an alternating component, said shutter being proportioned to produce substantial variations in its attenuation of such beam of sub-atomic particles and to be substantially transparent to radiations of greater penetrating power, whereby high energy background radiations do not substantially influence such alternating component of voltage, means synchronized with said shutter to provide an alternating voltage 180° out-of-phase with the alternating component of voltage provided by said detector, means to compare the relative amplitudes of said alternating component of voltage and said 180° out-of-phase voltage, and calibrated means to vary the amplitude of one of such voltages relative to the amplitude of the other.

10. A gage as in claim 9 in which the means to compare the relative amplitudes of the alternating component of voltage and the 180° out-of-phase voltage includes a voltage amplifier and a phase-sensitive detector.

11. A thickness gage comprising a detector of subatomic particles of the type which provides a voltage proportional in magnitude to the rate of arrival of such particles at the detector, a source of subatomic particles positioned to direct a beam of such particles through the material measured toward said detector, means including a shutter positioned in such beam between said source and said detector to modulate periodically the particle density of such beam, so that the voltage provided by said detector has an alternating component, a motor to drive said shutter, an alternator driven in synchronism with said shutter by said motor to provide an alternating voltage 180° out-of-phase with the fundamental alternating component of voltage provided by said detector, means to compare the relative amplitudes of said alternating component of voltage and said 180° out-of-phase voltage, and calibrated means to vary the amplitude of one such voltage relative to the amplitude of the other.

12. A gage as in claim 11 in which the calibrated means to vary the amplitude of one voltage includes a calibrated attenuator in the output circuit of the alternator.

13. A thickness gage comprising a detector of subatomic particles of the type which provides a voltage proportional in magnitude to the rate of arrival of such particles at the detector, a radioactive source of subatomic particles and shielding means therefor positioned to direct a beam of such particles through the material measured toward said detector, a rotary shutter positioned in such beam between said source and said detector to modulate periodically the particle density of such beam, said shutter being so constructed and proportioned that the maximum attenuation provided by the shutter is just sufficient to eliminate from the beam substantially all subatomic particles of the type which it is desired to use in making the thickness measurement, so that the voltage provided by said detector has an alternating component, a motor to drive said shutter, an alternator driven in synchronism with said shutter by said motor to provide an alternating voltage 180° out-of-phase with the alternating component of voltage provided by said detector, a calibrated variable attenuator connected in the output circuit of said alternator to vary the amplitude of such 180° out-of-phase voltage, circuit means for adding instantaneous values of the attenuated 180° out-of-phase voltage to the alternating component of voltage provided by said detector to obtain an error voltage equal to such sum, an amplifier to amplify such error voltage, and means including a phase-sensitive detector to indicate the fundamental component amplitude and phase of such error voltage.

14. A gage as in claim 13 in which the beam of subatomic particles used consists principally of beta rays.

15. A thickness gage comprising a detector of subatomic particles of the type which provides a voltage proportional in magnitude to the rate of arrival of such particles at the detector, a first source of subatomic particles adapted to direct a first beam of such particles through the material measured toward said detector, a second source of subatomic particles adapted to direct a second beam of such particles toward the detector but not through the material measured, a shutter and operating means therefor positioned in the paths of both beams to modulate periodically the respective particle densities of both such beams, the modulation of the second beam being 180° out-of-phase with the modulation of the first beam, so that the voltage provided by said detector has a first alternating component responsive to particles of the first beam and a second alternating component, 180° out-of-phase with the first, responsive to particles of the second beam, so that the net modulation-frequency alternating component of such voltage has an amplitude dependent upon the difference in particle densities of the two beams reaching the detector and a phase dependent upon which beam has the greater particle density, said shutter being proportioned to produce substantial variations in its attenuation of such beams of sub-atomic particles and to be substantially transparent to radiations of greater penetrating power, whereby high energy background radiations do not substantially influence such alternating components of voltage, indicating means responsive to the amplitude and phase of such net modulation frequency alternating component, and a calibrated variable attenuator positioned and adapted to reduce the particle density of one of said beams by an adjustable amount.

16. A gage as in claim 15 in which the indicating means includes an amplifier and a phase-sensitive detector.

17. A gage as in claim 16 having automatic means for adjusting the calibrated variable attenuator responsive to the output of the phase-sensitive detector, to automatically reduce the net modulation-frequency alternating component of voltage substantially to zero.

18. A gage as in claim 17 in which both beams of subatomic particles consist principally of beta rays.

19. In combination with a radiation detector of the type having output terminals across which a voltage is provided dependent in magnitude upon the intensity of radiation reaching the detector, modulating means to periodically modulate such radiation so that the output voltage of said detector has a periodic alternating component, alternating voltage supply means having output terminals connected in series with the output terminals of said detector, means to operate said modulating means and said supply means in synchronism and in fixed phase relation such that the voltage across the output terminals of said supply means is in phase opposition to the fundamental alternating component of voltage across the output terminals of said detector, means to adjust the relative amplitudes of said voltages, and means connected in voltage-responsive relation across said series-connected output terminals to measure any inequality in such voltages.

CHARLES W. CLAPP.

REFERENCES CITED

The following references are of record in the file of this patent:

UNITED STATES PATENTS

| Number | Name | Date |
| --- | --- | --- |
| 2,349,429 | Herzog | May 23, 1944 |
| 2,451,572 | Moore | Oct. 19, 1948 |

OTHER REFERENCES

Michel and Rich, General Elec. Review, Feb. 1947, pp. 45–48.

Certificate of Correction

Patent No. 2,488,269                                               November 15, 1949

CHARLES W. CLAPP

It is hereby certified that errors appear in the printed specification of the above numbered patent requiring correction as follows:

Column 3, line 53, for "strontium 80" read *strontium 90*; line 62, for "Strontium 80" read *Strontium 90*;

and that the said Letters Patent should be read with these corrections therein that the same may conform to the record of the case in the Patent Office.

Signed and sealed this 16th day of May, A. D. 1950.

[SEAL]

THOMAS F. MURPHY,
*Assistant Commissioner of Patents.*

Certificate of Correction

Patent No. 2,488,269 November 15, 1949

CHARLES W. CLAPP

It is hereby certified that errors appear in the printed specification of the above numbered patent requiring correction as follows:

Column 3, line 53, for "strontium 80" read *strontium 90*; line 62, for "Strontium 80" read *Strontium 90*;

and that the said Letters Patent should be read with these corrections therein that the same may conform to the record of the case in the Patent Office.

Signed and sealed this 16th day of May, A. D. 1950.

[SEAL]

THOMAS F. MURPHY,
*Assistant Commissioner of Patents.*